United States Patent Office 2,748,093
Patented May 29, 1956

2,748,093

SCREEN VEHICLE COMPRISING DIPHENYL, UN-MODIFIED HYDROGENATED ROSIN, AND ITS GLYCOL ESTERS

William C. Morris, Mayfield Heights, Ohio, assignor to The Harshaw Chemical Company, Cleveland, Ohio, a corporation of Ohio No Drawing. Original application October 21, 1950, Serial No. 191,481, now Patent No. 2,617,740, dated November 11, 1952. Divided and this application November 3, 1951, Serial No. 254,791

2 Claims. (Cl. 260—27)

This invention relates to an improved method of applying glass enamel or ceramic coatings to glass or metal objects, and to improved compositions for use in such process.

It has long been customary to apply designs to objects to be decorated by the use of a screen having certain portions blocked off to form a design. The screen process has taken numerous specific forms and, for the most part, the enamel constituents have been suspended in a suitable oil known as screen oil. The mixture of screen oil and enamel constituents is pressed or squeegeed through the screen into contact with the object to be decorated, and is dried thereon. Another form of the screen process involves the use of a vehicle, in place of the screen oil, which is solid at the temperature of the object to be decorated, ordinarily room temperature, and which is applied at a temperature at which it has a suitable consistency. This form of the screen process has the advantage that it is not necessary to wait for the object to dry before is is sent to the next operation. It is with this type of screen process that the present invention is concerned.

I have now discovered certain novel compositions of the type indicated which are characterized in having highly desirable properties rendering them suitable for the indicated use. These are useful especially in a process comprising applying such compositions by means of a metal screen of usual type except that it is heated during application of the design by passing electric current therethrough to an extent to keep the surface at a temperature sufficiently above the melting point of said compositions to prevent clogging. In this way the compositions which are plastic or pasty at the temperature at which they are held just prior to application, need not be held at as high a temperature as would be necessary if the screen were not heated.

One class of compositions suitable for my purpose comprises a mixture of polyethylene glycols of molecular weights predominantly in the range from 1500 to 6000. Minor proportions outside this range can be tolerated. A very desirable combination is as follows:

| | Parts by weight |
|---|---|
| Polyethylene glycol of molecular weight 1,540 | 5 to 35 |
| Polyethylene glycol of molecular weight 4,000 | 10 to 70 |
| Polyethylene glycol of molecular weight 6,000 | 10 to 70 |

An optimum specific example is as follows:

| | Per cent |
|---|---|
| Polyethylene glycol of molecular weight 1,540 | 20 |
| Polyethylene glycol of molecular weight 4,000 | 40 |
| Polyethylene glycol of molecular weight 6,000 | 40 |

The polyethylene glycol of molecular weight 4,000, or of other molecular weight intermediate between 1,500 and 6,000, may be regarded as the fundamental vehicle while a material of relatively low molecular weight, for example, 1,540, is used to produce sufficient flow for good application, and obliteration of screen marks in the early portion of the firing cycle. The polyethylene glycol material of higher molecular weight is employed for the purpose of rendering the film relatively hard at room temperature and to reduce the tendency of the coating to run on firing.

The foregoing compositions can be improved by the addition of a small percentage of urea, although, its addition is not absolutely essential. Urea, however, is desirably added up to 7½% of the combined weight of polyethylene glycols. The urea renders the film somewhat tougher at the temperatures at which I prefer to operate without tending to cause the composition to adhere to the heated screen.

The above indicated compositions may be mixed with the enamel constituents (pigment and flux) in a ratio of from 20 to 40 parts of the vehicle to 80 to 60 parts of the enamel constituents.

Another class of compositions may consist of (1) diphenyl, (2) hydrogenated rosin, and (3) an ethylene glycol ester of hydrogenated rosin. Such compositions may be used in proportions, for example, as follows:

| | Parts by weight |
|---|---|
| Diphenyl | 40 to 90 |
| Hydrogenated rosin of melting point 168° F., acid value 162, and density at 25° C. 1.045 | 2 to 20 |
| Ethylene glycol ester of hydrogenated rosin of melting point 131° F., acid value 0 to 15, and density at 25° C. about 1.06 | 10 to 30 |

To the foregoing composition it may be desirable to add a diethylene glycol ester of hydrogenated rosin of lower melting point, for example, one having a melting point of 104° F., acid value 0 to 15, and density at 25° C. about 1.05. This may be added to the extent of up to 30%. It is also desirable, but not necessary, to add a polybutene of molecular weight from 40,000 to 120,000 to the extent of up to 10% of the weight of the three first named constituents.

In this case, as before, the vehicle may be mixed with the refractory enamel constituents, in the ratio of from 20% to 40% of the vehicle to 80% to 60% of the refractory components.

Diphenyl may be regarded as the fundamental vehicle, and the other materials as additives for modifying the properties of the diphenyl. Ethylene glycol esters, or diethylene glycol esters, of hydrogenated rosin render the freezing point of the mixture somewhat less sharp, and make the coating less brittle. Polybutene acts as a bodying agent and also aids suspension of pigment in the vehicle.

Specific examples of compositions suitable for my purpose are as follows:

*Example I*

| | Parts by weight |
|---|---|
| Polyethylene glycol of molecular weight 1,540 parts by weight | 20 |
| Polyethylene glycol of molecular weight 4,000 parts by weight | 40 } 30 |
| Polyethylene glycol of molecular weight 6,000 parts by weight | 40 |
| Enamel (pigment and flux) | 70 |

*Example II*

| | Parts by weight |
|---|---|
| Composition of Example I | 100 |
| Urea | 5 |

Example III

| | Parts by weight |
|---|---|
| Diphenyl | 65 |
| Hydrogenated rosin, melting point 168° F., acid value 162, specific gravity 25° C. 1.045 | 10 |
| Ethylene glycol ester of hydrogenated rosin, melting point 131° F., acid value 15, specific gravity 25° C. 1.06 | 25 |

Example IV

| | Parts by weight |
|---|---|
| Composition of Example III | 100 |
| Diethylene glycol ester of hydrogenated rosin, melting point 104° F., acid value 15, specific gravity 25° C. 1.05 | 15 |
| Polybutene molecular weight 40,000 | 5 |

Compositions of the types indicated may be applied to glass or metal in the following manner:

The composition made up of the above indicated vehicle, together with the enamel constituents in the proportions indicated, is applied to the glass or metal surface through a screen having a suitable design. The temperature of the composition just before application will be such as to afford the desired working consistency and preferably will be from about 55° C. to 115° C. The screen will be heated by the passage of an electric current therethrough, and will be maintained at a temperature at or somewhat above the temperature of the composition to be applied to the screen, preferably about 5° C. thereabove or about 60° C. to 120° C. The objects to be decorated will ordinarily be at room temperature (usually 25° C. to 35° C.) although they may be somewhat above or somewhat below room temperature. In any event, the temperature of the object to be decorated will be sufficiently below the freezing temperature of the composition to be applied that immediately upon application the composition will freeze, thus permitting another application of a different color immediately in the case of multicolor printing, or permitting immediate transfer of the objects to the lehr where the organic material is driven off by the calcination leaving the inorganic enamel constituents fused on the objects to be decorated.

Screen enamels of various types may be used. The low melting fluxes of the lead boro-silicate type mixed with suitable coloring oxides and various additions for imparting specific properties to the enamels, such as $TiO_2$ for acid resistence, are typical. The above described compositions not only have properties suitable for the application, but volatilize on firing without causing defects in the enamel coating.

It will be understood that the components of the composition are thoroughly admixed before being applied. The mixing is best accomplished by grinding the ingredients together suitably in a paint mill of the three-roll type. Desirably the vehicle, the enamel ingredients, and the mill, are all maintained at a temperature within the range from 100° C. to 110° C. during the mixing, each being preheated to that temperature range before the mixing operation is commenced.

This application is a division of my co-pending application Serial No. 191,481, filed October 21, 1950, now Patent No. 2,617,740, issued November 11, 1952.

Having thus described my invention, what I claim is:

1. A composition suitable for use as a vehicle for the application of enamel by a screen process, the same comprising diphenyl to the extent of 40 to 90 parts by weight; a hydrogenated rosin of melting point about 168° F., acid value about 162, and density at 25° C. about 1.045, to the extent of from 2 to 20 parts by weight; an ethylene glycol ester of hydrogenated rosin of melting point about 131° F., acid value about 15, and density at 25° C. about 1.06, to the extent of from 10 to 30 parts by weight; a diethylene glycol ester of hydrogenated rosin of melting point about 104° F., acid value about 15, and density at 25° C. about 1.05, up to 30 parts by weight; and polybutene, molecular weight from 40,000 to 120,000, up to 10 parts by weight.

2. A composition suitable for application by the screen process comprising 2 to 40 parts of the composition defined in claim 1, and 80 to 60 parts of enamel pigments and enamel flux combined.

References Cited in the file of this patent

UNITED STATES PATENTS

| 2,331,803 | Schlaanstine | Oct. 12, 1943 |
| 2,462,037 | Davis et al. | Feb. 15, 1949 |
| 2,462,631 | Gittings et al. | Feb. 22, 1949 |
| 2,505,740 | Mavis et al. | Apr. 25, 1950 |
| 2,532,699 | De Coste | Dec. 5, 1950 |